Aug. 17, 1965  L. D. O. TEARNE  3,201,063
HORIZONTAL CENTRAL TRANSFER POINT
Filed May 18, 1962  4 Sheets-Sheet 3
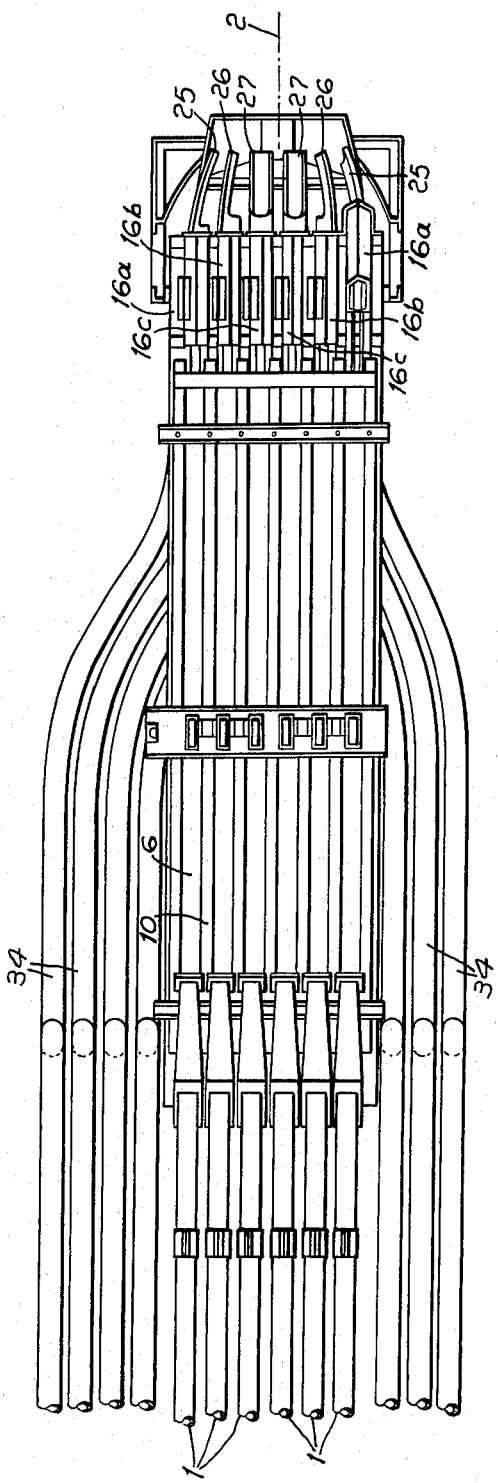
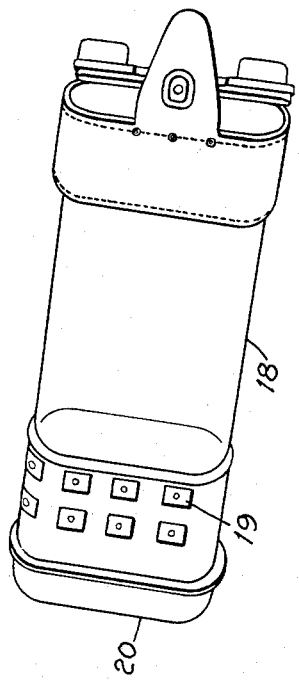
INVENTOR.
LEWIS D. O. TEARNE
BY
ATTORNEY

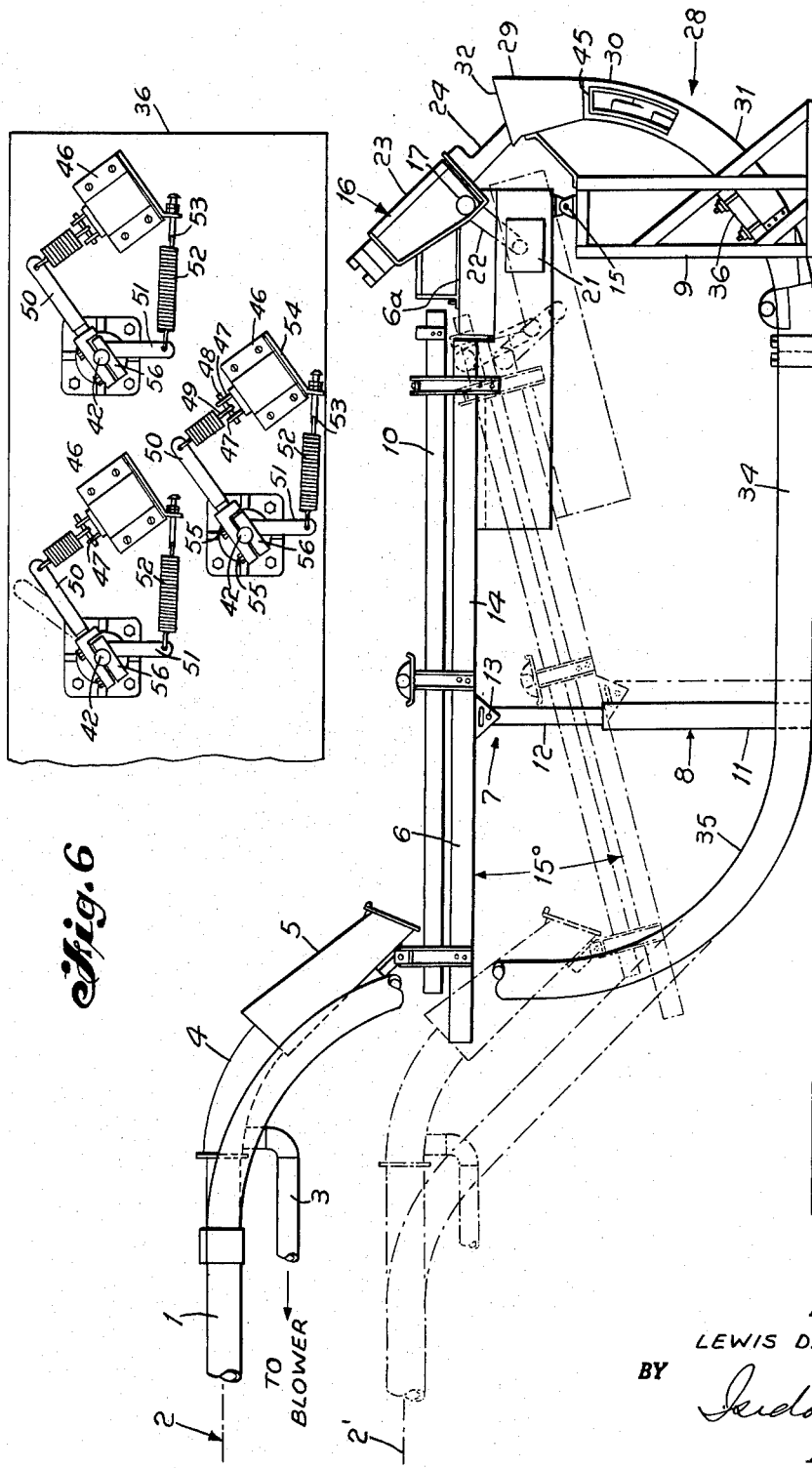

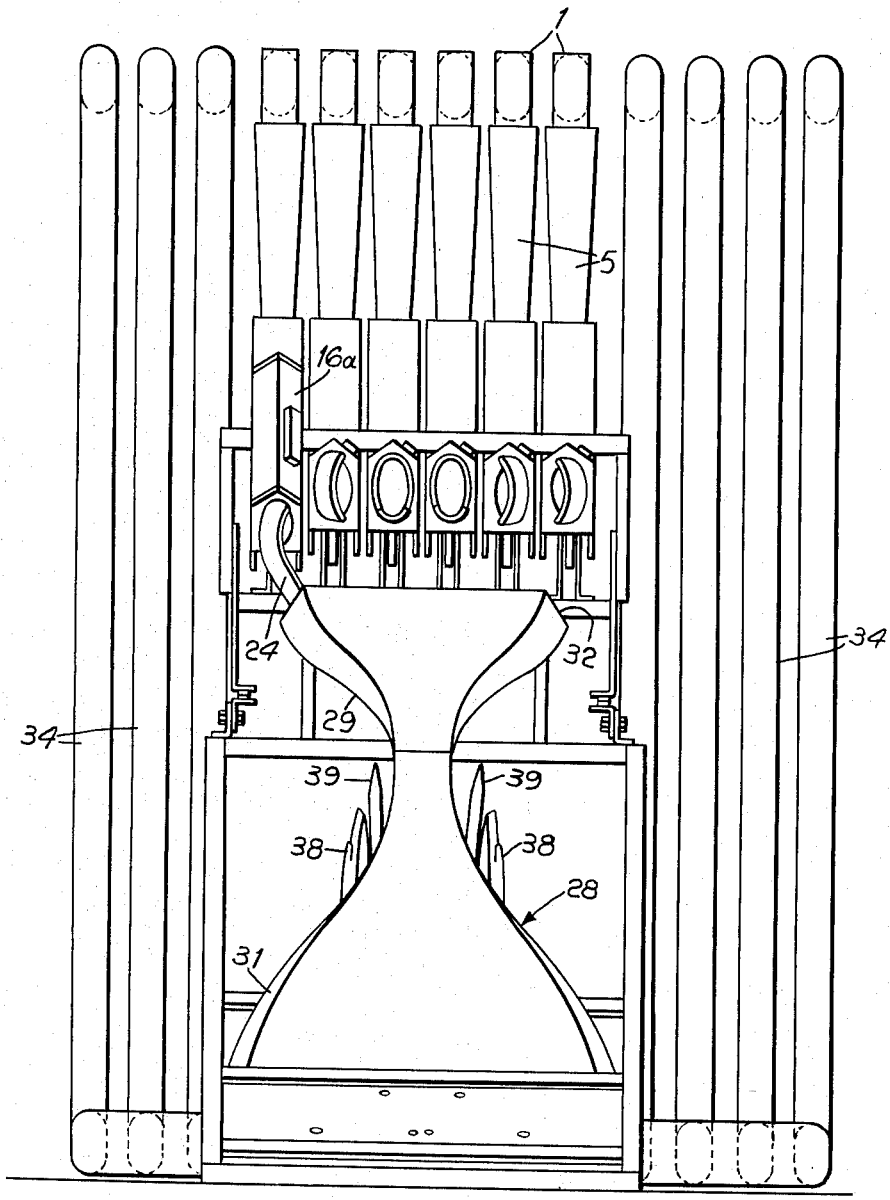

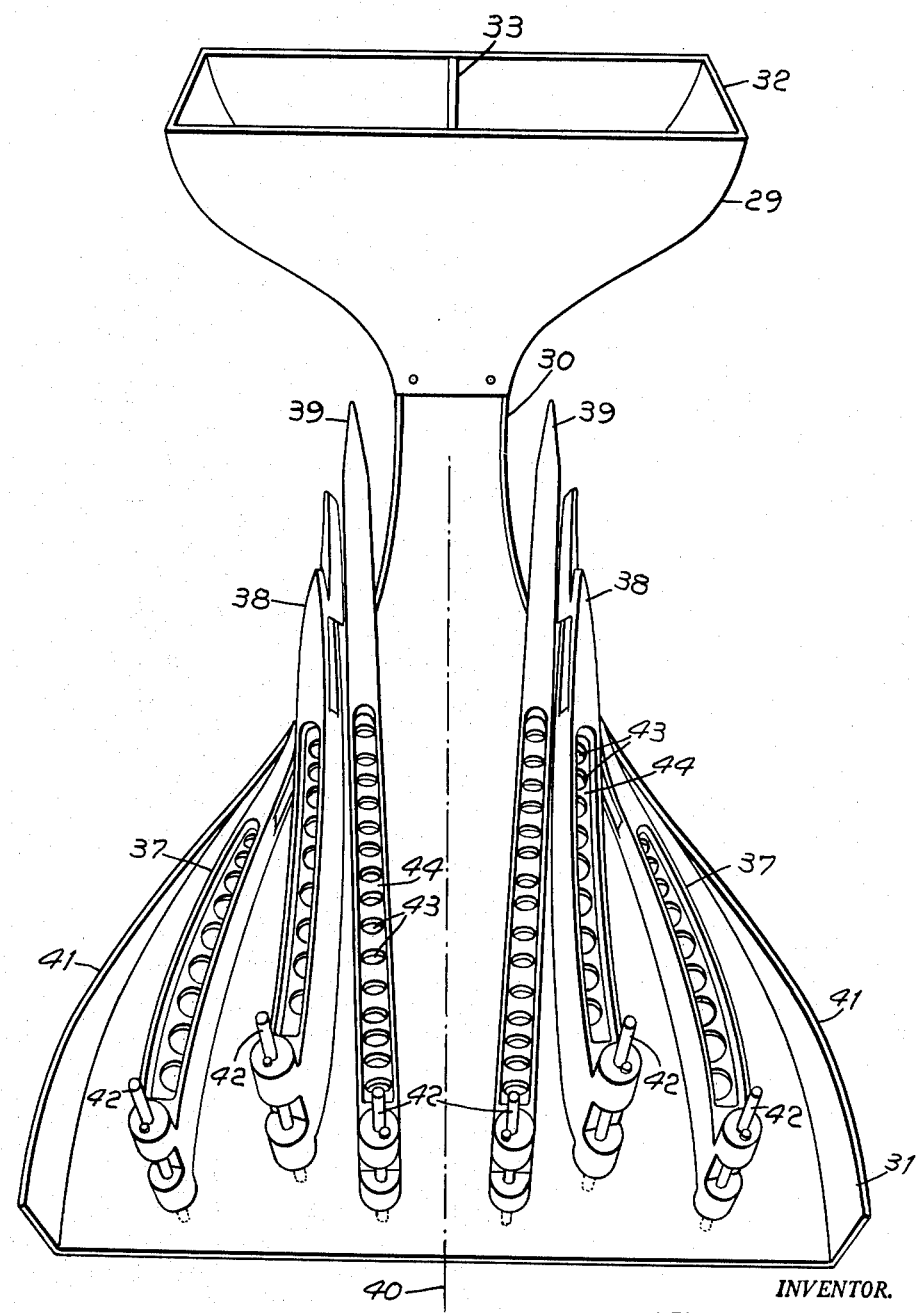

3,201,063
HORIZONTAL CENTRAL TRANSFER POINT
Lewis D. O. Tearne, Bergenfield, N.J., assignor to International Telephone and Telegraph Corporation, Nutley, N.J., a corporation of Maryland
Filed May 18, 1962, Ser. No. 195,806
9 Claims. (Cl. 243—19)

This invention relates to an arrangement for transferring carriers in a conveyor system from one conduit to another.

The common pneumatic conveyor system has a number of conduits serving various stations or terminals and all the conduits connecting into a common transfer point which receives the carriers and dispatches them to their destinations. In pneumatic systems now in use, these transfer points occupy fully equipped a height generally more than one story of the building in which the pneumatic system is installed. This height is necessary to provide for the curves of the conduits, both the incoming and the outgoing conduits, from the transfer point and the discharge apparatus and storage room. It is, of course, desirable to have a transfer arrangement which will provide a most economical layout whereby the height required for the transfer arrangement can be substantially decreased.

It is an object of this invention to provide a central transfer point for pneumatic conveyor systems that utilizes a minimum dimension in height for the pneumatic system.

It is another object of this invention to provide for a central transfer for a pneumatic conveyor system which is horizontally disposed, thereby minimizing the height required for such an arrangement.

A feature of this invention is a central transfer arrangement for a pneumatic conveyor system comprising input and output tubes disposed in horizontal planes and distribution means coupled thereto and utilizing the force of gravity for the distribution of the carriers conveyed in said system from said input to said output tubes.

Another features is that the distribution means are curved in at least two planes and are disposed intermediate the input conveyor tubes located in a first horizontal plane and the output conveyor tubes disposed in a second horizontal plane.

The above-mentioned and other features and objects of this invention will become more apparent by reference to the following description taken in conjunction with the accompanying drawings, in which:

FIG. 1 is a side elevation view of the central transfer point of this invention;

FIG. 2 is a front elevation view of the central transfer point;

FIG. 3 is a plan view of the central transfer point;

FIG. 4 is a front view of the distributor of the central transfer point partially uncovered to show the carrier deflection means;

FIG. 5 is a view of a typical carrier used in the conveyor system; and

FIG. 6 is a plan view of one side of the support for the solenoids which control movements of the deflector arms.

Heretofore in a pneumatic conveyor system, the central transfer point for the reception and dispatch of carriers to their proper destinations have mainly utilized vertically or near vertically disposed conduits leading into and leading away from the central transfer point which are properly curved in one plane to provide for the appropriate travel of the carriers therein. This vertical arrangement, however, requires a large vertical space and in most cases more than one floor of the building housing the pneumatic conveyor system is required for that purpose. In this invention, the central transfer point is arranged intermediate the input and output conveyor tubes which are disposed in horizontal planes and which therefore minimize the height required for such transfer point. It is possible with this novel arrangement to utilizes less than one floor of the building instead of more them one floor heretofore required for high speed pneumatic conveyor systems.

With reference now to FIGS. 1, 2 and 3, there is shown the novel central transfer point of this system. As shown in the drawings, there is disclosed six incoming lines of conduits 1 which are horizontally disposed about an axis 2 and parallel thereto. Each of these lines is fed by a blower (not shown) line 3 which evacuates the air therefrom to provide the motor force for helping the carriers therethrough. Each line 1 merges with a curved line or conduit 4 which leads into a discharge valve 5. This discharge valve 5 is disposed at an angle above a motor driven belt 6. It is understood, of course, that there may be one wide belt for the whole arrangement servicing the six incoming conduits or individual belts for each conduit. The belts 6 are supported on a table 7 which has vertical legs 8 at one end and a vertically disposed framework 9 at another end. Above each belt are disposed guards 10 parallel thereto to keep the carrier within the confines of the horizontal path so that it will not deviate on to another path. The legs 8 at one end of the table consist of two portions, the bottom portion 11 and the top portion 12, which is slidably engaged in the bottom portion 11. The top portion 12 is pivotally attached by means of bracket pivot mounting 13 thereon to the table top 14. This permits the table top 14 containing the belts 6 and the guards 10 to be pivoted about the forward point 15 downwardly to a maximum angle of approximately 15 degrees. A greater angular adjustment, of course, is possible. This angular adjustment has the advantage that the incoming conveyor belts 6 can be disposed lower than the axis 2 to the axis 2′. As an example, it may be disposed along the lines of axis 2′ as shown in the broken line arrangement. Forward of the belt 6 is disposed the novel distribution arrangement of this invention. This comprises a spacer 16 for servicing each belt 6 of the incoming carriers and is well known in the art; these spacer devices space or delay the incoming carriers so that they are directed to the proper destination. The spacer 16 is pivotable about the axis 17. In one position, the spacer 16 is horizontally disposed adjacent the belt 6 so that a carrier being transferred on the belt 6 will at the appropriate time enter the spacer 16. The spacer 16 also has sensing means (not shown) for electrically sensing the destination of the carrier. The carrier used in this system as shown in FIG. 5 and consists of a cylindrical or oval body 18 with the usual bumper shock absorbing arrangements at each end and having destination means coded on the outside cylindrical or oval surface thereof with a number of metal plates or rings 19 in a well known fashion. The carrier shown in FIG. 5 is the oval type. It is to be understood, however, that this invention is not limited to the particular type of carrier shown. It can be used equally well with other carriers of different shapes and having more or fewer destination means thereon. The destination of the carrier as in the usual practice is determined by turning control rings or switches which are situated on the bottom surface 20 on the carrier (and are not shown) to the numbered destination desired which will then close a circuit between the common ground plate and the particular conductive plate selected. In the spacer 16, there is disposed a sensing arrangement, which is stated before as not shown, but which has contact fingers that ride on the carrier surface in contact with the conductive plates thereon and discovers the conductive path which is indicative of the destination selected. This information is then conveyed to the central electrical transfer arrangement (not shown) for activating the necessary relays and solenoids as will be described. The carrier spacing devices 16 control the traffic through the distribution or the distribution means of this central transfer point as will be shown. The carrier enters the spacer 16 via a second shorter belt 6a and the destination is sensed by the sensing arrangement carried by the spacer 16. At the proper time the spacer 16 is pivoted by means of a motor 21. The motor 21 is connected to the spacer 16 by means of a sprocket belt 22 which tips the spacer 16 to pivot about the pivot point 17. The spacer 16 has a body section 23 which is the same for all the six spacers arranged in parallel about the axis 2. However, the forward chute portion 24 of the spacer varies with each spacer 16. The spacers 16a disposed on the outside of the total arrangement have a curved chute 25 which is relatively long to direct the carrier as it leaves the spacer towards the axis 2 to go into the hopper portion of a distributor to be described later on. The spacers 16b also have curved chutes 26 but in view of the fact that these spacers are nearer to the axis 2, the length of the chutes is not as great as in the case of the chutes 25. The spacers 16c disposed directly about the axis 2 do not have curved chutes but straight chutes 27 since it is not necessary for the carriers in these two spaces to follow a curved path to approach the axis 2. Adjacent to and below the spacers 16 is disposed the novel curved deflector or distributor 28 of this invention. The curved distributor 28 comprises three sections, a hopper portion 29 which is adjacent to the spacer portion, a middle bottleneck 30 and a central deflector section 31. The hopper portion 29 is disposed in a substantially vertical position and has a mouth 32 wide enough so that all the chutes of the spacers 16 can be accommodated therein when the spacers 16 are pivoted about their pivot point 17. This is more clearly shown in FIG. 2 where the end spacer 16a is shown pivoted with the chute 24 being accommodated in the mouth 32 of the hopper. As shown more clearly in FIG. 4, the hopper 29 carries a deflection member 33 in the center of the hopper 29 which extends downwardly towards the bottleneck section and is necessary to prevent twisting of an oval carrier as it enters the hopper and falls downward. It can be seen that the distributor 28 is disposed substantially in the vertical position with the hopper portion 29 vertical and then curves downwardly and to left by virtue of the bottleneck 30 and the bottom portion, the deflector 31, is curved almost to the horizontal plane which is parallel to the plane of the axis 2. The deflector 31 is disposed adjacent the outgoing lines (conveyor tubes) 34 which comprise seven lines, six lines for destination and one line which is a safety or reject tube. Said one tube is provided to receive those carriers which are not correctly coded for any one of said six destination tubes. Such incorrect coding arises from human error or is the result of faults in the coding means, and the latter faults are introduced by the shock and abuse to which the carriers, bearing the coding means, are customarily subjected. The outgoing lines 34 are substantially parallel for a short distance and then by virtue of a compound curve section 35 are carried upwards to another horizontal plane.

The central deflector 31 carries on the bottom thereof a plate support 36 which is used to support the deflector or switch arms and the solenoids that control the rotation of the switch arms. Referring more particularly to FIG. 4, which shows the front view of the distributor with the cover plate over the deflector arms removed and the solenoids also not shown in position, it is seen therein how these deflector arms operate to control the transfer of the carriers to the appropriate outgoing lines 34. The deflector arms or switch arms, as they may be called, are curved in two directions as is the deflector and bottleneck. First they are curved to follow the curvature of the deflector and bottleneck about an axis perpendicular to the plane of the paper of FIG. 1. Secondly, the switch arms or deflector arms are curved about an axis through the plane of the paper in FIG. 4. The deflector arms comprise two outside arms 37, two intermediate arms 38 and two arms 39 adjacent the axis 40 of the distributor 28. The two outside arms 37 have a shorter radius of curvature about the axis through the plane of the paper in FIG. 4 to more nearly conform with the outside curvature 41 of the deflector portion 31. The intermediate arms 38 have a slight curvature as being closer to the axis 40, while the two inside arms 39 are parallel with the axis 40 but curved about the axis through the plane of the paper of FIG. 1. The inner and outer surfaces of the deflector arms 37 and 38 are not parallel but curve to a sharp edge at the free ends. Deflector arms 39 are parallel for most of their length and then converge to a sharp edge. It is obvious therefore that these deflector arms are curved in two directions to correspond with the curvature of the distributor 28 and to properly route the entering carriers to their destination. It is also obvious that the carriers coming through the hopper portion 29 and existing through the deflector portion 31 can follow any one of seven paths as shown by the spacers between the deflector arms themselves and the two end deflector arms and the curved periphery 41 of the deflector portion 28. Each of these deflector arms pivots about the pivot means 42 which are coupled to solenoids (46, FIG. 6) and rotatable in conformance with the destination information sensed in the spacer 16 to direct the carrier to the proper destination. One end of the switch arm pivots; the other ends are so shaped that they blend in, one to the other, so as to provide a smooth path for the carrier. To provide for greater strength and rigidity and also to save weight, the deflector arms are constructed in ribbed fashion with holes 43 in the webbing 44. The side surfaces 41 of the bottleneck and deflector portions of the distributor 28 have substantially rectangular holes 45 cut therein to allow for the free ends of the deflector arms to move outside of the bottleneck portion when necessary. In the position shown in FIG. 4, the deflector arms are arranged so that a carrier will exit through the middle of the distributor 28 into the conduit 32 coupled thereto. The distributor system of this invention, in effect, controls the movement of a carrier in three dimensions and by virtue of the pivotable spacer and curved distributor and distributor arms is capable of effecting transfers of carriers from horizontal to horizontal conveyor lines. The force of gravity is utilized to move the carrier from the spacers to the output conveyor tubes and no compressed air is required to effect the transfer. This permits a faster and safer distribution of the carriers.

Referring now to FIG. 6, there is shown solenoids 46 which cause movement of the deflector arms. Each pivot means 42 is connected to a solenoid 46 via core arms 47, pin 48, spring 49, and arm 50 which is rigidly attached to pivot means 42 by bolts 55 and clamp plate 56. When a solenoid is activated, the core arms 47 associated with it are drawn into the solenoid and through pin 48 and spring 49, draw arm 50 toward the solenoid. When the solenoid is deactivated, arm 51 via spring 52, and connection 53 (which is connected to support 54 on the back of solenoid 46) brings arm 50 back into its rest position (shown in dotted lines for one solenoid) and thus the deflector arms back into their rest positions via pivot means 42.

While I have described above the principles of my invention in connection with specific apparatus, it is to be clearly understood that this description is made only by way of example and not as a limitation to the scope of my invention as set forth in the objects thereof and in the accompanying claims.

I claim:

1. A central transfer arrangement for a pneumatic conveyor system comprising:

input means for conveying carriers in a horizontal plane, tiltable means, pivotally mounted, for receiving said horizontally conveyed carriers, and for tilting said carriers toward the vertical plane to discharge them by gravity, and means for receiving said carriers from said tiltable means for distributing said carriers by laterally changing their axes of travel, and returning them to a horizontal attitude.

2. A central transfer arrangement for a pneumatic conveyor system comprising:
   a plurality of input conveyor tubes;
   a plurality of output conveyor tubes;
   said input and output conveyor tubes being disposed in horizontal planes;
   a plurality of spacing means for receiving carriers in a horizontal plane;
   means for pivoting said spacing means for gravity discharge of said carriers in a partially vertical plane;
   means to convey said carriers discharged from said input tubes into said spacing means;
   distribution means having an input in at least a partially vertical plane to receive said carriers from said spacing means upon the latter being pivoted into its partially vertical plane and having an output in a substantially horizontal plane, said distribution means including carrier conveying means at least partially vertical to convey said carrier by gravity from said spacing means to said output tubes; and
   means coupling said distribution means to said output tubes.

3. A central transfer arrangement according to claim 1 wherein said input means comprise a plurality of input conveyor tubes, further including output means coupled to said distributing means and including a plurality of output conveyor tubes.

4. A central transfer arrangement according to claim 3 wherein the direction of conveyance of one said plurality is the reverse of the other.

5. A central transfer arrangement according to claim 2 wherein said distribution means comprises a curved distributor.

6. A central transfer arrangement according to claim 5 wherein said curved distributor has a hopper portion, adjacent to said spacing means, which is substantially vertical, having at the top a slight inclination from the vertical towards said adjacent spacing means; a bottleneck portion which is vertical, joining said hopper portion and a deflector portion; said deflector portion being formed in the shape of an inverted hopper, and curved from the vertical at the top to the horizontal at the bottom, said bottom of said deflector portion being adjacent to said output tubes.

7. A cenral transfer arrangemen according to claim 3 wherein both said pluralities are horizontally disposed.

8. A spacer assembly for a pneumatic conveyor system adapted to receive carriers from a conveyor at one end of said assembly and discharge the carriers from the other end to distribution means comprising
   a plurality of spacers disposed in parallel in symmetrical arrangement about the axis of said conveyor system and said distribution means,
   each said spacer comprising a body and a chute coupled to one end of the body,
   pivot means disposed on the end of said body coupled to said chute whereby said spacer is rotatable about said pivot means,
   each said chute being shaped to direct the discharge of the carrier from said spacer to a path adjacent said axis.

9. A spacer assembly according to claim 8 wherein the chutes of the spacers disposed symmetrically adjacent the axis are parallel and the chutes of the spacers farther removed from the axis are curved to direct the carriers toward the axis, the chutes of the spacers farther removed from the axis having a greater length.

References Cited by the Examiner
UNITED STATES PATENTS

| | | | |
|---|---|---|---|
| 1,452,280 | 4/23 | MacLaren | 243—1 |
| 1,597,465 | 8/26 | Hepperie | 243—1 X |
| 1,729,635 | 10/29 | Van Steen | 243—1 X |
| 2,052,597 | 9/36 | Beckmann | 243—1 |
| 2,241,917 | 5/41 | Mehlis et al. | 243—16 |
| 2,712,910 | 7/55 | Goerlich | 243—16 |
| 2,773,658 | 12/56 | Van Otteren et al. | 243—1 |
| 2,865,578 | 12/58 | Hennessy | 243—16 |
| 2,970,791 | 2/61 | Hafner et al. | 243—16 |

FOREIGN PATENTS

| | | |
|---|---|---|
| 678,781 | 1/30 | France. |
| 678,075 | 7/39 | Germany. |
| 890,327 | 9/53 | Germany. |

SAMUEL F. COLEMAN, *Primary Examiner.*

KARL J. ALBRECHT, *Examiner.*